United States Patent Office

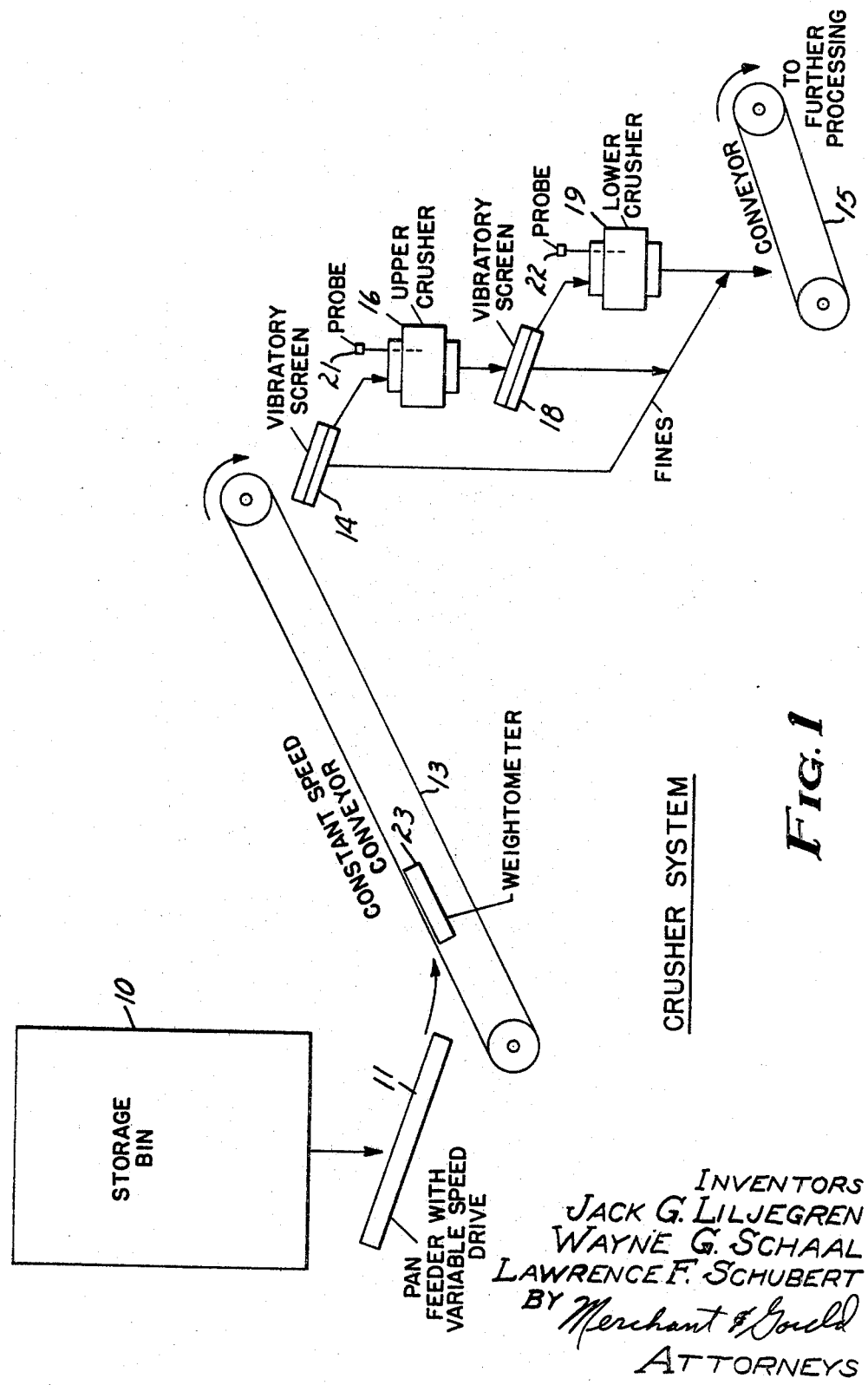

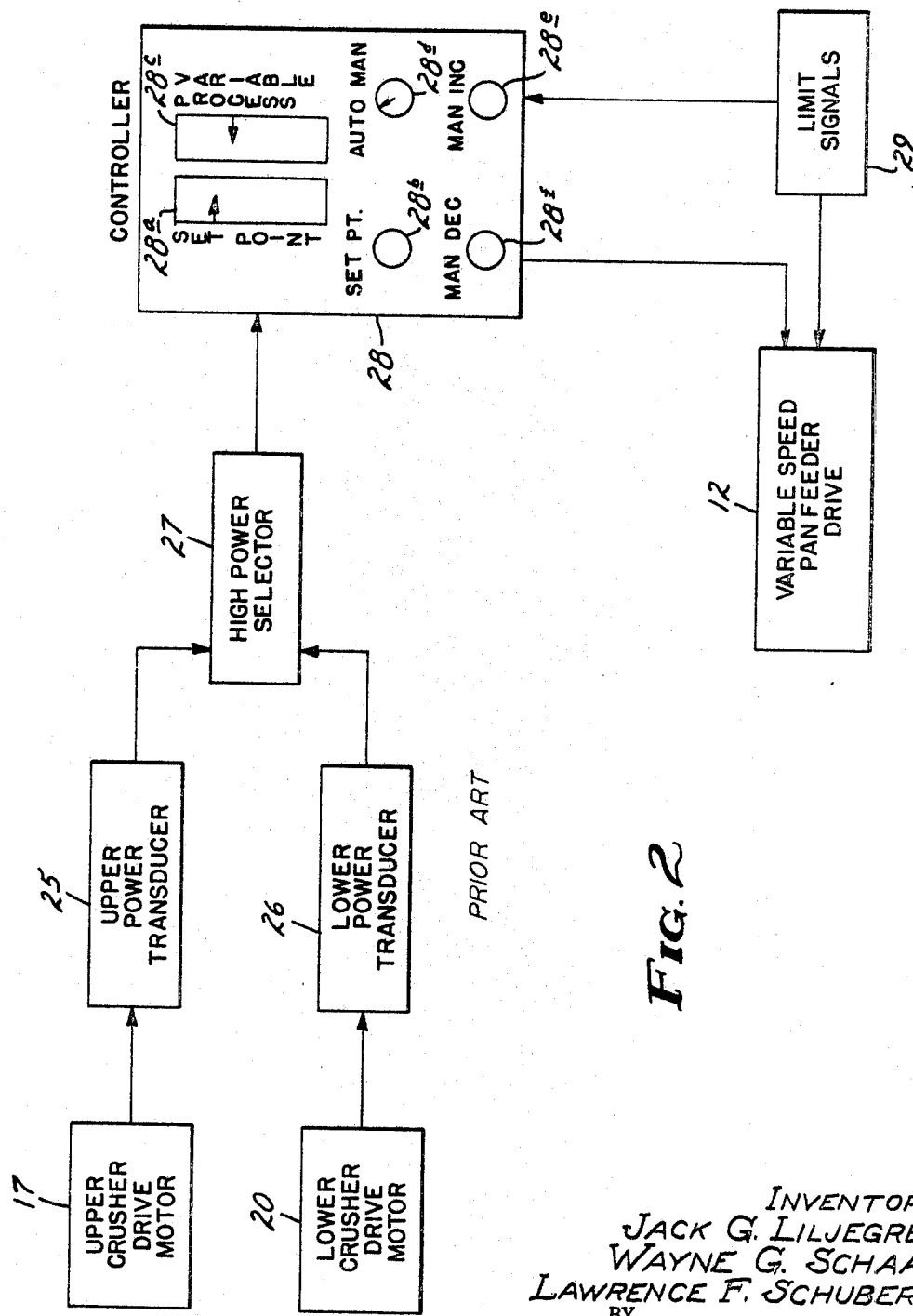

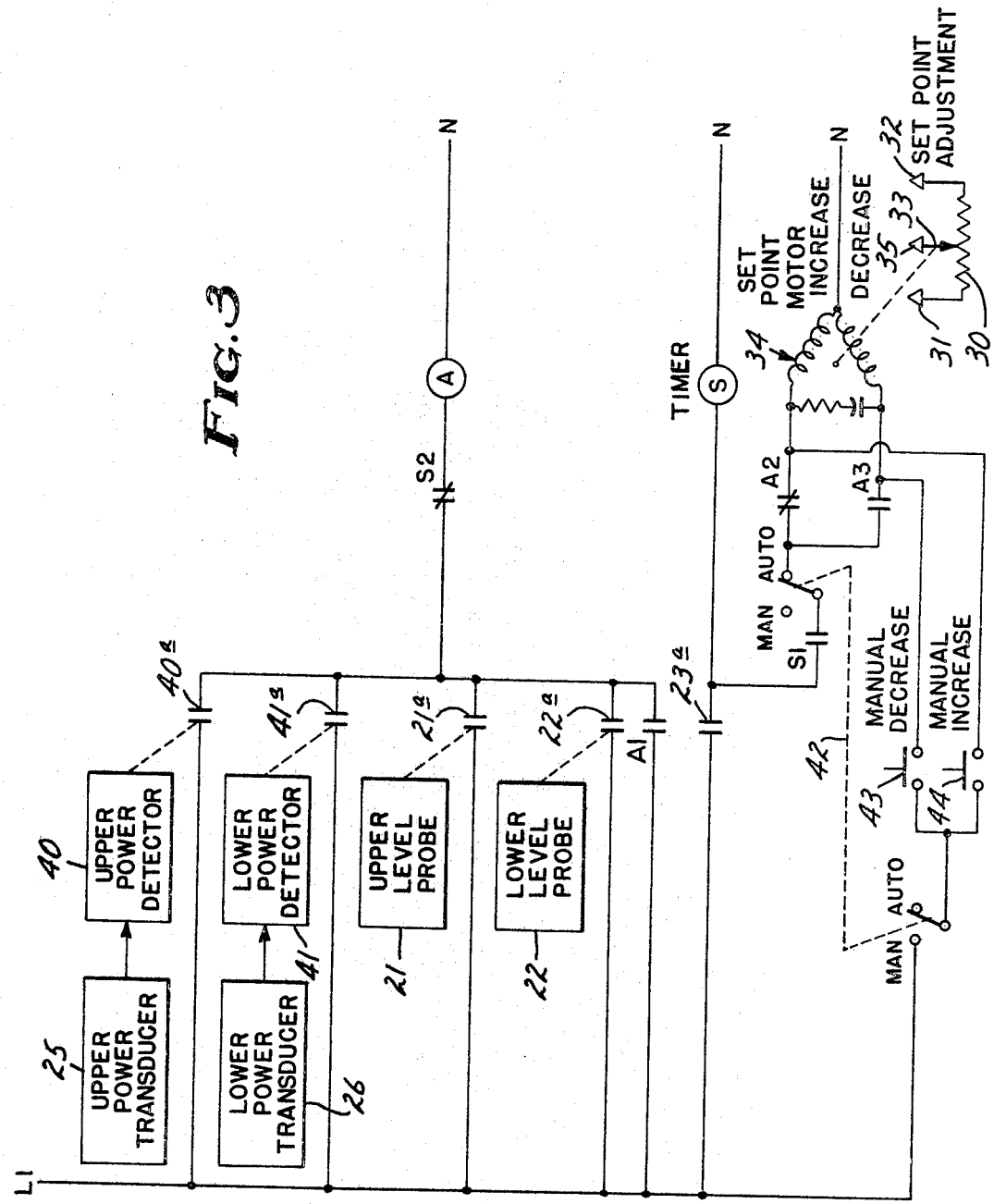

3,480,212
Patented Nov. 25, 1969

3,480,212
CONTROL APPARATUS
Jack G. Liljegren, Wayne G. Schaal, and Lawrence F. Schubert, Silver Bay, Minn., assignors to Reserve Mining Company, Silver Bay, Minn., a corporation of Minnesota
Filed Feb. 23, 1967, Ser. No. 617,923
Int. Cl. B02c 25/00
U.S. Cl. 241—34                                                    10 Claims

ABSTRACT OF THE DISCLOSURE

A control system for varying the feed rate of material being fed to a pair of series connected grinding machines, driven by electric motors, in response to certain process variables including variations in the power consumption of the motors. The selected power consumption control level or set point and consequently the feed rate are automatically and continually raised under normal operating conditions and lowered when the level exceeds a predetermined maximum.

BACKGROUND OF THE INVENTION

*Field of the invention*

This invention relates to an automatic control system for grinding machines in which the set point is periodically raised under normal system operating conditions to thereby increase the load on the machines, and in which the set point is periodically lowered whenever the load exceeds a predetermined level to thereby reduce the load on the machines.

*Description of the prior art*

Our invention was designed to control the rate at which taconite ore is fed to electrically driven cone crushers in a taconite processing plant. It has long been recognized that it is not possible to feed the ore into the cone crusher at a constant rate. Because of the rapidly changing process variables in the crusher operation, it is imperative that the feed rate be periodically changed if optimum output is to be achieved. The process variables that change from time to time include feed size, crushability of the material and crusher condition.

A method of controlling a crusher is to measure the power consumption of the electrical drive for the crusher and to change the feed rate to the crusher in response to variations in power consumption. An increase in power consumption will indicate that the crusher is becoming overloaded, therefore requiring a reduction in the feed rate. The basic control system is often supplemented with devices that shut down the system or stop feed to the crusher if an emergency condition arises. Means are also provided in the basic control system to take care of such control problems as offset and process lag. Even such sophisticated systems, however, cannot anticipate the effect of a sudden change in the size or the crushability of the ore. The first indication of such a problem is often a sudden increase in power consumption. If there is any process lag at all in the system, caused by long, constant speed conveyor belts for example, even a rapid reduction in the feed rate is often not enough to prevent shutdown of the system.

To operate a normal automatic control system, the operator adjusts the set point on the automatic controller to operate the system at the desired crusher motor power level. If no abnormal conditions occur, the controller will maintain the feed rate to the crusher such that the selected motor horsepower consumption level is maintained. This type of system operates in a satisfactory manner as long as all operating conditions remain reasonably constant. However, if the operating conditions change, the system will have difficulty in controlling at the desired set point. The major problem lies in changes in feed conditions. For example, a sudden increase in feed size might overload the crusher even though the same amount of material was being sent to the crusher. In such a situation, the crusher will often reach an emergency high power condition before the automatic control system has an opportunity to decrease the feed rate. In an emergency high power condition, the flow of feed to the crusher must be stopped completely to prevent plugging of the crusher, resulting in an extended shutdown.

If shutdowns occur quite frequently, the only solution is for the operator to decrease the set point and operate the system at a reduced power level. A reduction in the set point causes a decrease in the feed rate under normal conditions such that the crusher can handle the uncontrollable variations in feed size without developing excessively high power. Although reducing the set point of the controller solves the shutdown problem, it creates additional problems. Once the set point is reduced to a value where the crusher can operate and handle the varying conditions without getting into high power problems, there is no way of knowing when the conditions change such that the set point can again be raised. As a result the crusher often operates at less than maximum tonnage. The efficiency of a system in which an operator reduces the set point in response to uncontrolled variations in operating conditions is quite low, since the system is not often operating at maximum tonnage.

SUMMARY OF THE INVENTION

Our invention is designed to keep the grinding system operating at maximum tonnage by automatically checking certain operating conditions and thereafter automatically adjusting the set point of the automatic controller in the proper direction to obtain maximum feed rate for the existing conditions. The set point is periodically raised a predetermined amount under normal system operating conditions, and is alternately periodically lowered a predetermined amount in response to indications that the system is becoming overloaded. Means are also provided to restrict the raising or lowering of the set point to periodically reoccurring time intervals. Our inventive crusher control system, by constantly seeking to adjust the set point to obtain maximum feed rate for existing conditions, is much more efficient than existing crusher control systems in which the set point or feed rate is manually adjusted.

BRIEF DESCRIPTION OF THE DRAWINGS

FIG. 1 is a flow diagram illustrating the taconite crusher system that is controlled by our invention;

FIG. 2 is a schematic diagram of the prior art system for automatically controlling the crusher system of FIG. 1; and FIG. 3 is a diagram of additional circuitry that is added to the prior art control system of FIG. 2 in order to operate the system according to our invention.

DESCRIPTION OF THE PREFERRED EMBODIMENT

FIG. 1 discloses the crusher system to which our invention is applied. A storage bin 10 is provided for storing the ore coming from the coarse crusher plant (not shown). The ore that comes from the coarse crusher plant and is stored in storage bin 10 is approximately 3 to 4 inches in size. In the actual plant, several fine crushing storage bins 10 are provided, each 40 feet in diameter by 100 feet high and each having a capacity of 4800 long tons.

The coarse ore from storage bin 10 is removed by a pan feeder 11 with a variable speed drive 12 (drive 12 being shown in FIG. 2). The speed of pan feeder 11 can thus be regulated to change the amount of ore being removed from storage bin 10.

Pan feeder 11 delivers the ore to a constant speed conveyor 13 that in actual practice is 36 inches wide by 140 long. Conveyor 13 is capable of carrying up to 800 tons per hour to the fine crusher section. A conveyor scale or weightometer 23 is provided to measure the weight of ore on conveyor 13 to thereby indicate feed rate.

The ore from constant speed conveyor 13 is delivered to a first stage vibratory screen 14. Screen 14 is a double deck screen that in actual practice is 6 feet wide and 12 feet long. Vibratory screen 14 separates the ore into two portions. A fine portion, less than ¾ inch in diameter, bypasses the crushers and goes directly to a conveyor 15 where it is carried to further processing. The coarse portion of the ore is sent from vibratory screen 14 to first stage or upper fine crusher 16. Upper crusher 16 is a short head cone crusher capable of reducing taconite to minus 1¼ inches. Upper crusher 16 is driven by a 300 horsepower V-belt motor 17 (motor 17 being shown in FIG. 2).

The crushed ore from upper crusher 16 goes to a second double deck vibratory screen 18 similar in construction to screen 14. Again, the fines from screen 18 are sent directly to conveyor 15 for further processing. The portion of the ore from screen 18 comprising the larger pieces is sent to a second stage or lower fine crusher 19. Lower crusher 19 is capable of reducing to minus ¾ inch. Again, lower crusher 19 is driven by a 300 horsepower V-belt motor 20 shown in FIG. 2. The ore from lower crusher 19 is sent to conveyor 15 for further processing. Since the further processing is well known in the art, it need not be described here.

Referring now to FIG. 2, there is disclosed a prior art system for automatically controlling the crusher system of FIG. 1. Since the crushers are driven by electric motors, an accurate measure of load on the crushers is the power consumption of the motors. Since an increase in power consumption is an indication of an increased load on the crushers, the proper action to take in such case is to reduce the feed rate of the ore to the crushers. This control function is accomplished by the system of FIG. 2.

The power consumption of drive motors 17 and 20 is measured by a pair of power sensing transducers 25 and 26. The output from each transducer 25 and 26 is a signal that varies in accordance with the variations in power consumption of the associated drive motor. The output signals from transducers 25 and 26 are fed into a high power selector unit 27 that is designed to pass only that signal indicating the highest power consumption. By this means, the control system of FIG. 2 controls from either the upper or lower crusher drive motor, depending upon which unit is consuming the most power.

A control panel 28 is provided that will change the speed of pan feeder drive 12 in response to variations in the signal from selector unit 27. Controller 28 is normally an electric device of the type generally used in the control industry to control various industrial processes. Basically, control panel 28 is capable of sensing an input signal and providing an output signal having some known relationship to the input signal. In this case, a signal from either transducer 25 or 26 via selector unit 27 indicating an increase in power consumption will result in a signal from control panel 28 that will cause a reduction in the speed of pan feeder drive 12 to thus eventually reduce the load on the crushers. The system is a closed loop system in that changes made in the controlled variable will result in changes in the measured variable.

Although control panel 28 might well be provided with a purality of input signals and might have a large number of control dials and gages, most of those features have not been shown in detail here since they are not necessary for an understanding of the invention. Control panel 28 is shown as having a set point scale 28a and a set point adjustment knob 28b. The set point scale 28a is calibrated in terms of horsepower or power consumption. Control panel 28 will attempt to maintain whatever level of power consumption that is set on scale 28a. Adjustment knob 28b is provided so that the set point as shown on scale 28a can be raised or lowered manually.

Control panel 28 is also provided with a process variable scale 28c that is also calibrated in terms of horsepower or power consumption. The pointer on scale 28c provides a continuous visual indication of the amount of power being consumed by the drive motor that is being used for control purposes at that particular time. The operator, by viewing and comparing the pointers on scales 28a and 28c can quickly determine how closely the system is operating to the set point.

Control panel 28 is also provided with a manual-automatic switch 28d that enables the operator to switch from manual to automatic control. With switch 28d set in the auto position, control panel 28 will control the system at the power consumption level set on scale 28a. When switch 28d is rotated to the manual position, the speed of pan feeder drive unit 12 can be either increased or decreased manually by means of knobs 28e and 28f.

As previously stated, control panel 28 will attempt to maintain whatever level of power consumption that is set on scale 28a. Thus, if the system of FIG. 2 is being used to control the crusher system of FIG. 1, and if an overload occurs, the operator can lower the set point by means of knob 28b to effectively reduce the feed rate to the crushers. As long as the set point is set at the lower figure, the feed rate will remain at a correspondingly lower level, except for uncontrolled variations in the quality or size of the ore.

Also shown schematically in FIG. 2 is a source 29 of various limit signals that can be supplied to control panel 28, or to pan feeder drive 12. The typical system is equipped with limiting devices that are actuated by excessively high feed level in the crushers, excessively high power consumption by the crusher motors, or high or low feed rate as indicated by the conveyor weightometer. For example, there are shown in FIG. 1 a pair of probes 21 and 22 that measure the level of ore in crushers 16 and 19 respectively. Probes 21 and 22 are designed to provide a signal to reduce the feed rate to the crusher when the level of ore in the associated crusher reaches an unusually high level and maintain the lower feed rate until the ore level returns to normal. An increase in the ore level in a crusher beyond a certain point is an undesirable condition. If the crusher should overflow, the feeder screens ahead of the crusher can become plugged.

The prior art control system of FIG. 2 can maintain the selected power consumption level only so long as the process variables remain relatively constant. The system cannot anticipate the effect of a sudden change in the size or the crushability of the ore, for example. A sudden increase in the load would cause a sudden increase in power consumption. The control panel responds by reducing the pan feeder drive speed, which may or may not prevent an overload of the system. The only way to assure that no shutdown occurs is to establish the set point at a relatively low level so that even relatively large increases in the load can be handled without shutdown. It is obvious that a system operating at such a relatively low level under normal conditions, cannot achieve maximum efficiency.

Referring now to FIG. 3, there is disclosed the improved circuit, which when added to the prior art control system of FIG. 2, controls the crusher system according to our invention. The circuit of FIG. 3 provides means for periodically raising or lowering the set point of the basic control system in response to changes in various operating variables. As shown in FIG. 3, control panel 28 is provided with a motorized set point adjustment means.

The set point adjustment means includes a fixed resistance 30 connected between two terminals 31 and 32. A movable wiper 33 is driven by a reversible motor 34 in the usual fashion. Wiper 33 is connected to a terminal 35. In a typical electric or electronic control system, resistance 30 and wiper 33 would be connected into the control circuit, usually a Wheatstone bridge, such that movement of wiper 33 along resistance 30 would cause a change in the balance point of the bridge, thus a change in the set point. The set point adjustment means is in some cases an integral part of control panel 28. In our case terminals 31, 32, and 35 are provided on the panel so the set point adjustment is made externally to panel 28.

A source of power, labeled L–1 and N is provided for the circuit. The signals that are used to activate the circuit of FIG. 3 are obtained from upper and lower transducers 25 and 26, and from upper and lower level probes 21 and 22. The signal from upper transducer 25, in addition to being fed into high power selector unit 27 as previously described, is also fed into an upper power detector 40 having a normally open switch 40a operated thereby. The signal from lower transducer 26 is fed into a lower power detector 41 having a normally open switch 41a operated thereby. Power detectors 40 and 41 are power sensing units that will close their associated switch when the signal from the transducer exceeds a predetermined level indicative of an approaching overload condition. Therefore, if drive motor 17 for the upper crusher becomes overloaded, the signal from transducer 25 exceeds a predetermined level causing power detector 40 to close switch 40a. The same sequence of events occurs if lower crusher drive motor 20 is overloaded, switch 41a being closed in this case.

If the level of ore in upper crusher 16 rises above a predetermined level, probe 21 will cause the closure of its associated switch 21a. If the ore level in the lower crusher 19 exceeds a predetermined level, probe 22 will cause the closure of its associated switch 22a.

The circuit also includes the following components. A relay A is provided, having a normally open switch A1, a normally closed switch A2, and a normally open switch A3 operated thereby. A timer S is provided having a normally open switch S1 and a normally closed switch S2. A double pole-double throw switch 42 is provided to permit either automatic or manual operation of set point motor 34. Manual increase and decrease switches 43 and 44 are also provided.

Normally open switches 40a, 41a, 21a, 22a, and A1 are all connected in parallel, and the resulting parallel circuit is connected in series with switch S2 and relay A across the source of power. A normally open switch 23a operated by conveyor scale 23 is connected in series with timer S across the source of power. Switch 23a is closed under normal operating conditions as long as the feed rate exceeds a predetermined minimum. If the feed rate on conveyor 13 drops below the minimum rate, conveyor scale 23 causes switch 23a to open, thus stopping timer S.

The operation of our invention is as follows. First of all, it must be noted that the prior art control system of FIG. 2 forms the basic control system of our invention. The improved circuit of FIG. 3, according to our invention, provides means to automatically raise or lower the set point of the basic control system at periodic intervals. Therefore, the prior art control system of FIG. 2 provides its normal control function, with the set point of the system being determined by the circuit of FIG. 3.

The operation of the circuit of FIG. 3 will first be described with the system operating normally, that is, with no overload signals being transmitted into the circuit. Under normal circumstances, switches 40a, 41a, 21a, 22a, and A1 are all open so that relay A is deenergized. Switch 42 is in the auto position, and switches 43 and 44 are open. Timer S is operating since switch 23a is closed because of the ore being carried by conveyor 13.

Timer S runs constantly as long as switch 23a remains closed, which it does under normal circumstances. In the preferred form of the invention, timer S has a two minute cycle. Therefore, switch S1 is closed every two minutes for a predetermined period of time. With switch S1 closed, current flows from line L1, through switch 23a, switch S1, switch A2, and the increase winding of motor 34 to line N. Motor 34 thus runs in a direction to increase the set point until switch S1 again opens. As long as no abnormal conditions exist in the system, the set point will thus be increased a set amount every two minutes. The amount that the set point is increased each time is determined by the amount of time that switch S1 is closed, and the speed of motor 34.

Because of this continual gradual increase of the set point on control panel 28, the system will eventually overload the crushers. When this occurs, one of the detectors 40 or 41, or one of the probes 21 or 22 will cause its associated switch to close. For example, if power detector 40 determines that the power consumption of drive motor 17 has reached or exceeded a predetermined level, it will cause switch 40a to close, thereby energizing relay A through switch S2. When relay A is energized, a holding circuit is set up for relay A through the now closed switch A1. The warning signal is thus effectively stored in the circuit until switch S1 closes. When switch S1 closes, the decrease winding of motor 34 will be energized since switch A2 is now open and switch A3 is closed. Motor 34 will thus operate in the reverse direction to lower the set point.

Just after switch S1 operates (closes and opens) to energize motor 34, switch S2 opens to deenergize relay A, thus breaking the holding circuit through switch A1. In the preferred embodiment of the invention, switch S2 stays open for one minute to give the warning signal a chance to disappear. At the time switch S2 again closes, there will be approximately one minute remaining in the cycle until switch S1 again closes. If any of the parallel connected warning switches 40a, 41a, 21a, or 22a either remain closed or again close during the period when switch S2 is closed, relay A is again energized to set up the holding circuit through switch A1 so that the set point motor 34 will be cause to operate in a decrease direction when switch S1 again closes.

From the above description, it can be seen that as long as no abnormal load situation occurs, and the warning switches remain open, switch S1 will close every two minutes to energize the increase winding of motor 34 to thereby increase the set point a predetermined amount. If an overload situation arises, however, so that one or more of the warning switches closes, relay A will be energized to thereby reverse the direction in which the set point is adjusted. As long as one of the warning switches remains closed, the set point will be decreased every two minutes.

It can be seen that the circuit of FIG. 3 will continually change the set point of control panel 28 in a direction determined by the load on the crushers. Power detectors 40 and 41 and probes 21 and 22 are set to provide a signal when the system goes just beyond optimum load conditions. When these signals occur, it is not an indication that an emergency situation exists, but only that the system has passed the maximum normal operating level. By immediately reducing the set point when this occurs, the system will work itself back into a safe operating range rather than continuing to overload to reach a dangerous condition. Of course, the original safety limit signals are still provided so that if the system should overload, the feed to the crusher will be stopped before damage occurs. With our inventive system operating properly however, the system rarely reaches a dangerous load level.

Also provided in the circuit of FIG. 3 is a system for manually increasing or decreasing the set point. When switch 42 is moved to the manual position, the only way that motor 34 can be energized is via switches 43 and 44. With switch 42 in the manual position, the operator can then close either switch 43 or switch 44 to manually decrease or increase the set point by energizing the appropriate winding of motor 34.

The system, according to our invention, solves the problem of maintaining optimum load conditions without periodically overloading the crushers. All the advantages of the basic control system are retained. Instead of an operator having to manually adjust the set point after an overload condition has occurred, our system will sense that an overload is occurring and cause the set point to be reduced. As long as the system is operating normally, however, our system will cause the set point to be increased so that maximum output from the crusher is achieved. The system is thus constantly seeking an optimum control level.

It should be obvious that various modifications can be made in the method of implementing our invention without departing from the inventive concept. Although we have applied our optimizer control system to the control of ore crushers, the same theory should apply to other material handling apparatus as well. In the embodiment we have shown, timer S operates on a two minute cycle with switch S2 having a one minute closed period and a one minute open period. The two minute cycle of timer S can of course be changed without departing from the invention, if desirable for a particular situation. The closed period or "memory" period of switch S2 can also be changed if desirable, even without changing the basic two minute cycle. The duration of closure of switch S1 can also be changed to regulate the amount of increase or decrease in set point that occurs each time switch S1 closes. It should also be evident that other warning signals could be added or substituted for those shown herein without departing from the inventive concept. We therefore do not intend to be bound by the exact circuitry shown in our disclosure.

We claim:
1. In a system for performing work on a material subject to uncontrolled variations in quality, wherein said material is fed to a material working machine at a rate determined by the actual power consumption of said machine; a control system for continually optimizing the feed rate to said machine to achieve optimum output from said machine without overloading said machine, comprising:
 (a) automatic control means for measuring said actual power consumption level and for automatically varying the feed rate to said machine in response thereto, to maintain said actual power consumption level at a selected power consumption control level;
 (b) means for automatically and continually raising said selected power consumption control level under normal operating conditions; and
 (c) means for automatically and continually lowering said selected power consumption control level upon said measured actual power consumption level exceeding a predetermined maximum desirable level.

2. A system for varying the feed rate of material being fed to a grinding machine in response to variations in the actual power consumption thereof to achieve optimum output from said machine, comprising:
 (a) feed rate control means including means for measuring said actual power consumption, means for establishing a selected power consumption control level, and means for automatically regulating said feed rate in accordance with said measured actual power consumption to maintain said actual power consumption at said selected power consumption control level;
 (b) means for automatically and continually raising said selected power consumption control level under normal operating conditions; and
 (c) means for automatically and continually lowering said selected power consumption control level upon said measured actual power consumption exceeding a predetermined high level.

3. The apparatus of claim 2 including means for restricting said raising or lowering of said selected power consumption control level to periodically reoccurring time intervals.

4. In a system for crushing coarse taconite ore including a pair of series connected crushers, electrical drive means for each of said crushers, and variable speed feeder means for said crushers, a control system for varying the speed of said feeder means to regulate the load on said crushers to obtain optimum output, comprising:
 (a) transducer means connected to each of said drive means for sensing the power consumption thereof and for producing first and second electrical signals indicative of the power consumption of each of said crushers;
 (b) level sensing means for sensing an undesirably high ore level in said crushers and for producing third and fourth signals indicative thereof;
 (c) automatic controller means having means for establishing a set point at a desired level of power consumption;
 (d) circuit means connecting said automatic controller means to said transducer means and to said variable speed feeder means, said automatic controller means being adapted to monitor the higher of said first and second electrical signals and to control the speed of said feeder means in response thereto, to maintain the desired level of power consumption; and
 (e) further control circuit means connecting said transducer means and said level sensing means to said automatic controller means, including means for periodically raising said set point a predetermined amount under normal operating conditions, and for alternatively periodically lowering said set point a predetermined amount in response to said signals indicating either an undesirably high power consumption or an undesirably high ore level.

5. In a system for crushing coarse ore including a crusher, drive means for said crusher, and variable feeder means for said crusher, a load control system, comprising:
 (a) transducer means connected to said drive means for sensing the power consumption of said drive means and for producing a variable signal indicative of the load on said crusher;
 (b) automatic controller means having means for establishing a set point at a desired level of power consumption;
 (c) circuit means connecting said automatic controller means to said transducer means and to said variable feeder means, said automatic controller means being adapted to monitor said signal and to control said feeder means in response to variations in said signal to thereby vary the load on said crusher to maintain the desired level of power consumption; and
 (d) further circuit means connecting said transducer means to said automatic controller means including means for continually raising said set point in predetermined increments at timed intervals under normal operating conditions, and for relatively lowering said set point in predetermined increments at timed intervals in response to said signal indicating a predetermined maximum desirable load on said crusher.

6. The apparatus of claim 5 in which said coarse ore is taconite, said drive means for said crusher is an electrically operated motor, said feeder means is a variable speed pan feeder, and in which said transducer means is a wattmeter transducer adapted to monitor the electrical power consumption of said drive means.

7. The apparatus of claim 5 in which said means for continually raising or lowering the set point includes a rheostat operated by a reversible electric motor that is periodically energized for a predetermined increment of time, and in which circuit means are provided to permit manual energization of said motor for operation in either direction.

8. The apparatus of claim 5 wherein said means for raising or lowering the set point includes a reversible electric motor; and a series circuit, including a normally open timer switch that is closed at timed intervals by a continuously operating timer motor, is provided to periodically energize said electric motor.

9. The apparatus of claim 8 including:
(a) a relay having a normally closed switch and a normally open switch operated thereby; and
(b) said further circuit means including means for energizing said relay upon said signal reaching a level indicative of a maximum desirable load on said crusher, means for connecting said normally open relay switch and said normally closed relay switch in a parallel circuit, and means for connecting said parallel circuit in said series circuit between said normally open timer switch and said reversible electric motor.

10. The apparatus of claim 5 including:
(a) probe means for sensing and signalling an undesirably high ore level in said crusher; and
(b) said further circuit means including means for connecting said probe means to said automatic controller means, and means for lowering said set point in response to said probe signal.

References Cited

UNITED STATES PATENTS

| | | |
|---|---|---|
| 2,553,719 | 5/1951 | Palmer. |
| 2,766,941 | 10/1956 | Weston _____ 241—34 X |
| 2,922,587 | 1/1960 | Weston _____ 241—34 |
| 3,117,734 | 1/1964 | McCarty _____ 241—34 X |

ROBERT C. RIORDON, Primary Examiner

D. G. KELLY, Assistant Examiner